(12) United States Patent
Kim et al.

(10) Patent No.: US 12,731,838 B2
(45) Date of Patent: Sep. 8, 2026

(54) BUTTON-TYPE SECONDARY BATTERY

(71) Applicant: LG ENERGY SOLUTION, LTD., Seoul (KR)

(72) Inventors: Min Gyu Kim, Daejeon (KR); Yong Gon Lee, Daejeon (KR); Je Jun Lee, Daejeon (KR); Jae Won Lim, Daejeon (KR); Geon Woo Min, Daejeon (KR); Min Su Cho, Daejeon (KR); Joo Hwan Sung, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 589 days.

(21) Appl. No.: 18/018,029

(22) PCT Filed: Sep. 16, 2021

(86) PCT No.: PCT/KR2021/012698

§ 371 (c)(1),
(2) Date: Jan. 25, 2023

(87) PCT Pub. No.: WO2022/060124

PCT Pub. Date: Mar. 24, 2022

(65) Prior Publication Data

US 2023/0268593 A1 Aug. 24, 2023

(30) Foreign Application Priority Data

Sep. 17, 2020 (KR) ........................ 10-2020-0119621
Aug. 27, 2021 (KR) ........................ 10-2021-0113894

(51) Int. Cl.
*H01M 50/166* (2021.01)
*H01M 50/109* (2021.01)
(Continued)

(52) U.S. Cl.
CPC ....... *H01M 50/166* (2021.01); *H01M 50/109* (2021.01); *H01M 50/184* (2021.01);
(Continued)

(58) Field of Classification Search
CPC ............. H01M 50/109; H01M 50/166; H01M 50/186; H01M 50/545; H01M 50/533; H01M 50/184; H01M 50/193
See application file for complete search history.

(56) References Cited

U.S. PATENT DOCUMENTS 6,521,373 B1 * 2/2003 Suzuki ................ H01M 10/052 429/162
2006/0216588 A1 9/2006 Kim et al.
(Continued)

FOREIGN PATENT DOCUMENTS

CN 205583003 U 9/2016
CN 107195807 A 9/2017
(Continued)

OTHER PUBLICATIONS

Extended European Search Report issued Mar. 26, 2024 for European Patent Application No. 21869746.4 (Note: CN 211182396 U was cited in a prior IDS.).
(Continued)

*Primary Examiner* — Allison Bourke
*Assistant Examiner* — Verita E Grannum
(74) *Attorney, Agent, or Firm* — Morgan, Lewis & Bockius LLP

(57) ABSTRACT

A button-type secondary battery includes an electrode assembly; a lower can in which the electrode assembly is disposed and on which a first screw thread is defined on an outer circumferential surface thereof; an upper can which is configured to cover an opening of an upper end of the lower can and on which a second screw thread corresponding to
(Continued)

the first screw thread is defined on an inner circumferential surface thereof; and an insulator interposed between the upper can and the lower can to prevent the upper can and the lower can from being electrically short-circuited with each other, wherein an electrode tab extending from an electrode of the electrode assembly is in contact with the upper can.

17 Claims, 4 Drawing Sheets

(51) Int. Cl.

*H01M 50/184* (2021.01)
*H01M 50/186* (2021.01)
*H01M 50/193* (2021.01)
*H01M 50/533* (2021.01)
*H01M 50/545* (2021.01)

(52) U.S. Cl.

CPC ....... *H01M 50/186* (2021.01); *H01M 50/193* (2021.01); *H01M 50/533* (2021.01); *H01M 50/545* (2021.01)

(56) References Cited

U.S. PATENT DOCUMENTS

| | | | |
|---|---|---|---|
| 2012/0202108 A1 | 8/2012 | Kim et al. | |
| 2017/0207491 A1 | 7/2017 | Tamachi et al. | |
| 2020/0083497 A1 | 3/2020 | Sabrowsky et al. | |
| 2021/0111454 A1 | 4/2021 | Zhu et al. | |

FOREIGN PATENT DOCUMENTS

| | | | | | |
|---|---|---|---|---|---|
| CN | 109346626 A | | 2/2019 | | |
| CN | 110854306 A | | 2/2020 | | |
| CN | 111162210 A | | 5/2020 | | |
| CN | 211182396 U | * | 8/2020 | | |
| CN | 211208486 U | | 8/2020 | | |
| CN | 111613739 A | | 9/2020 | | |
| JP | S52-100135 A | | 8/1977 | | |
| JP | S53-10027 A | | 1/1978 | | |
| JP | 2007-294111 A | | 11/2007 | | |
| JP | 2010-267466 A | | 11/2010 | | |
| JP | 2017-130435 A | | 7/2017 | | |
| JP | 2019-16594 A | | 1/2019 | | |
| JP | 2019-523520 A | | 8/2019 | | |
| KR | 10-0322062 B1 | | 3/2002 | | |
| KR | 10-0670526 B1 | | 1/2007 | | |
| KR | 10-2020-0007559 A | | 1/2020 | | |
| KR | 10-2020-0007562 A | | 1/2020 | | |
| KR | 10-2020-0020173 A | | 2/2020 | | |
| KR | 10-2086036 B1 | | 3/2020 | | |
| WO | WO-2021114329 A1 | * | 6/2021 | .......... | H01M 50/545 |

OTHER PUBLICATIONS

Office Action issued Apr. 2, 2024 for Japanese Patent Application No. 2023-510459 (Note: CN 211182396 U, CN 111613739 A, JP 2007-294111 A, KR 10-2020-0007559 A & CN 107195807 A were cited in a prior IDS.).

International Search Report (with partial translation) and Written Opinion dated Dec. 28, 2021, for corresponding International Patent Application No. PCT/KR2021/012698.

Office Action issued on Sep. 23, 2025 in Chinese Patent Application No. 202180055755.X (Note: CN110854306A and CN111613739A cited therein have already been cited in a prior IDS.).

Notice of Allowance issued on Jul. 21, 2026 in Korean Patent Application No. 10-2021-0113894.

* cited by examiner

BUTTON-TYPE SECONDARY BATTERY

CROSS-REFERENCE TO RELATED APPLICATION

The present application claims the benefit of the priority of Korean Patent Application Nos. 10-2020-0119621, on Sep. 17, 2020, and filed 10-2021-0113894, filed on Aug. 27, 2021, which are hereby incorporated by reference in their entirety.

TECHNICAL FIELD

The present invention relates to a button-type secondary battery, and more particularly, to a button-type secondary battery, which has strong coupling so that a gas that is harmful to the human body does not leak to the outside of the battery even though an excessive internal pressure is generated by the gas generated inside the battery, and an electrolyte does not leak to the outside of the battery, and is simplified and convenient in manufacturing process to improve production efficiency.

BACKGROUND ART

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases. Also, recently, due to the trend of smaller wearable devices, the importance of developing small batteries such as button-type secondary batteries has been highlighted.

FIG. 1 is a cross-sectional view of a button-type secondary battery according to the related art.

Referring to FIG. 1, a button-shaped secondary battery 10 according to the related art has a shape that is divided into upper and lower housings and has a structure in which an upper cylindrical can 4 and a lower cylindrical can 3 are press-fitted. That is, an outer diameter of the lower cylindrical can 3 is slightly larger than that of an upper portion thereof to realize the press-fitting. In the case of the press-fitting, it is the principle that a shape of the button-type secondary battery is maintained due to friction force due to the press-fitting. Also, in the button-shaped secondary battery according to the related art, the upper can 4 and the lower can 3 are manufactured to match a size of an internal electrode assembly 1 so as to be press-fitted with each other, and thus, there is no available space therein.

However, in this configuration, when the internal pressure increases due to generation of an internal gas, etc., there is no fixing force other than frictional force, and thus, there is a high possibility that the upper can 4 and the lower can 3 are separated from each other. If the internal pressure rises, the internal pressure may rise due to side reactions and also rise during a normal cycle, but if the internal pressure excessively rises, the upper can and the lower can are separated from each other and thus may not function as a battery.

Therefore, it is necessary to research a product in which upper and lower cans are not separated from each other because the upper and lower cans are strongly coupled to each other.

DISCLOSURE OF THE INVENTION

Technical Problem

The present invention has been devised to solve the above problems, and an object of the present invention is to provide a button-type secondary battery, which has strong coupling so that a gas that is harmful to the human body does not leak to the outside of the battery even though an excessive internal pressure is generated by the gas generated inside the battery, and an electrolyte does not leak to the outside of the battery, and is simplified and convenient in manufacturing process to improve production efficiency.

Technical Solution

The button-type secondary battery according to the present invention relates to a button-type secondary battery, of which a diameter is greater than a height, comprises: an electrode assembly; a lower can in which the electrode assembly is inserted and on which a first screw thread is formed on an outer circumferential surface thereof; an upper can which is configured to cover an opening of an upper end of the lower can and on which a second screw thread corresponding to the first screw thread is formed on an inner circumferential surface thereof; and an insulator interposed between the upper can and the lower can to prevent the upper can and the lower can from being short-circuited, wherein an electrode tab extending from an electrode of the electrode assembly is in contact with the upper can.

The upper can may comprise an upper can electrode terminal part connected to the electrode of the electrode assembly through the electrode tab to form a terminal connected to an external device and configured to cover the opening of the upper end of the lower can, and the electrode tab may comprise: a support part connected to the electrode of the electrode assembly; and a contact part extending from the support part so as to be in contact with the upper can electrode terminal part.

The support part may be formed in a bar shape, and the contact part may be formed in a circular ring shape.

The contact part having the circular ring shape may have a thickness greater than that of the support part.

The support part may be formed in a bar shape, and the contact part may be formed in a circular plate shape.

An outer circumferential diameter of the contact part formed in the circular ring shape and an outer circumferential diameter of the electrode assembly may have sizes corresponding to each other.

An insulation plate may be provided between the contact part and a top surface of the electrode assembly.

The insulator may be made of a polybutylene terephthalate (PBT) material.

The insulator may comprise: an inner insulator disposed inside the lower can; an outer insulator disposed outside the lower can; and a connection insulator configured to connect the inner insulator to the outer insulator.

The upper can and the lower can may be screw-coupled to each other by the first screw thread and the second screw thread, the outer insulator may be interposed between the first screw thread and the second screw thread, and the outer insulator may be pressed by a protruding shape of each of the first screw thread and the second screw thread to form an uneven shape and be fitted between the first screw thread and the second screw thread.

The inner insulator may be disposed between the electrode tab and the lower can to prevent the electrode tab and the lower can from being in contact with each other.

A center hole may be formed in a center of the electrode assembly, and a center pin may be provided in the center hole so as to be fully filled in the center hole.

An end of the upper can may be bent in a direction of a central axis of the lower can.

The outer insulator may extend downward along an outer wall of the lower can, wherein an end of the outer insulator may further extend downward than an end of the upper can.

Advantageous Effects

The button-type secondary battery according to the present invention relates to the button-type secondary battery and may comprise the electrode, the lower can into which the electrode assembly is inserted and on which the first screw thread is formed on an outer circumferential surface thereof, the upper can on which the second screw thread corresponding to the first screw thread is formed, and the insulator interposed between the upper and the lower can to prevent the short circuit between the upper and the lower can from occurring. Here, the electrode tab extending from the electrode of the electrode assembly may be in contact with the upper can, and thus, even though the excessive internal pressure is generated by the gas generated inside the battery, the strong coupling may be provided so that the gas that is harmful to the human body does not leak to the outside of the battery, and the electrolyte does not leak to the outside of the battery, to realize the simplified and convenient battery manufacturing process, thereby the production efficiency.

MODE FOR CARRYING OUT THE INVENTION

Figure 1:
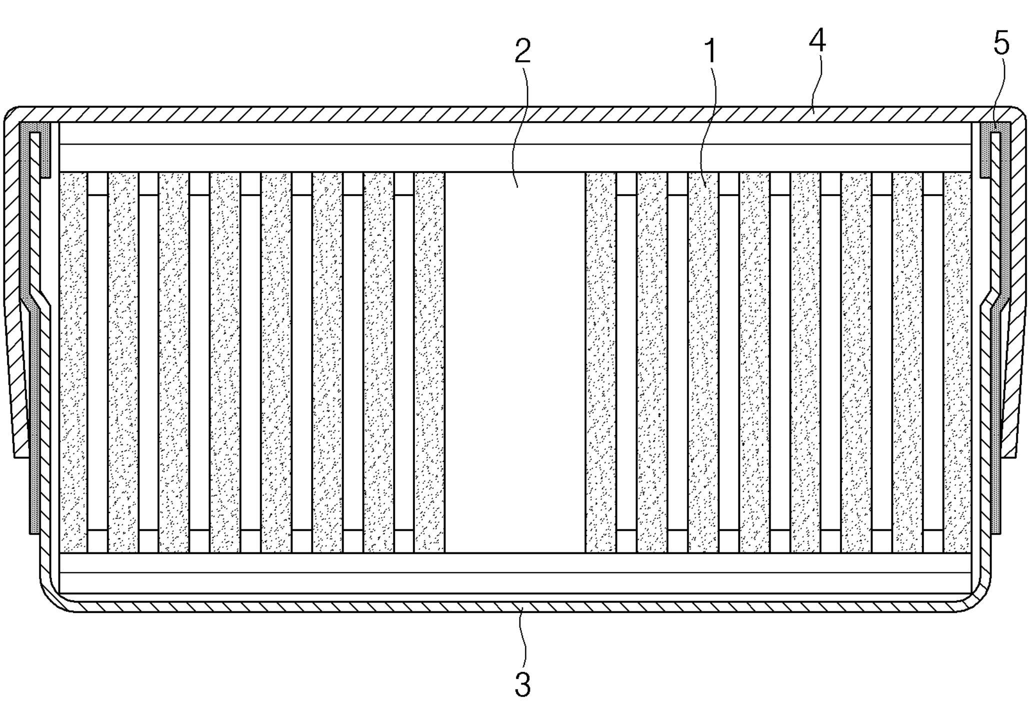
FIG. 1 is a cross-sectional view of a button-type secondary battery according to the related art.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 2:
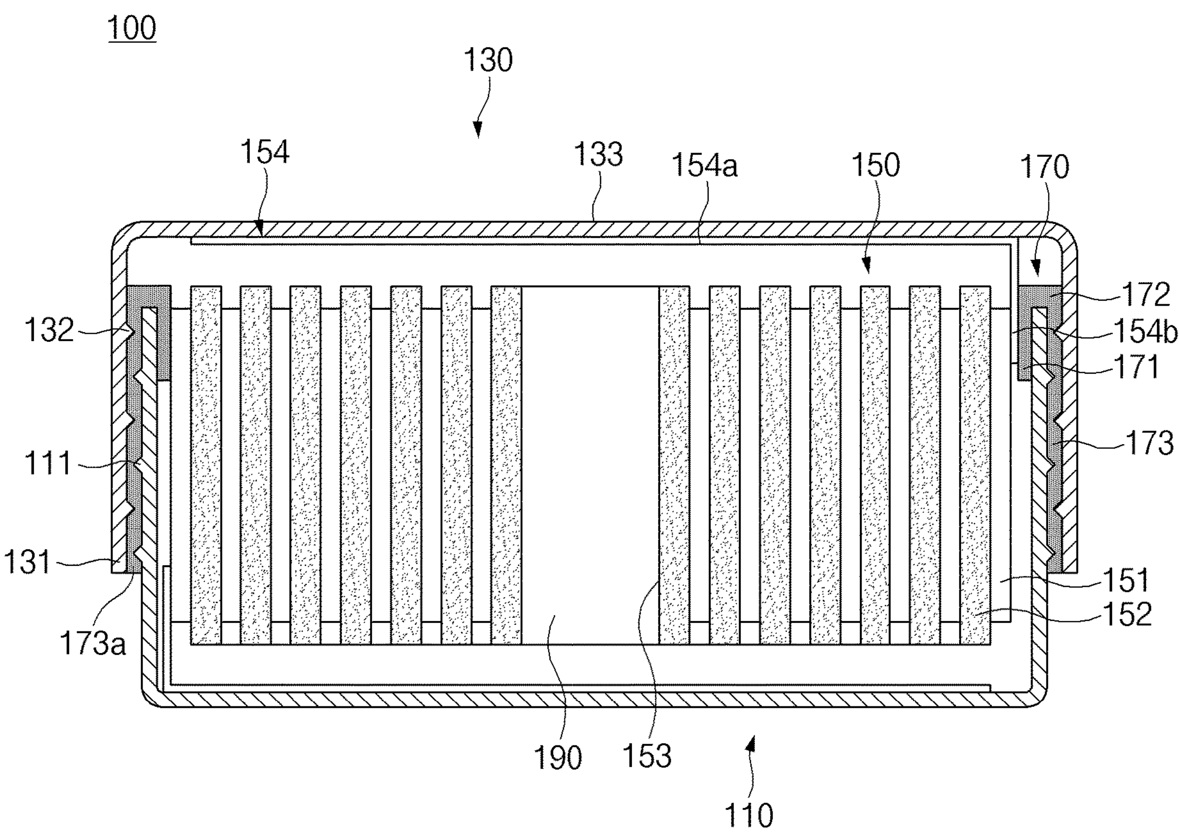
FIG. 2 is a cross-sectional view of a button-type secondary battery according to Embodiment 1 of the present invention.
Figure 3:
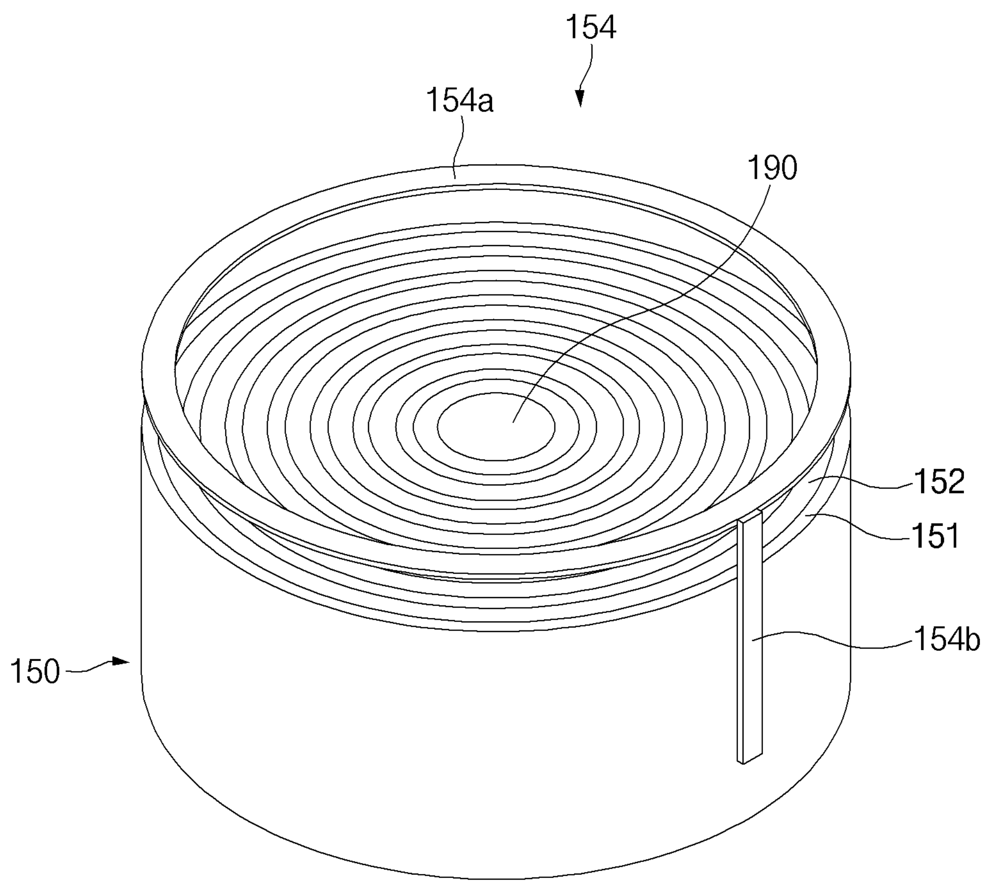
FIG. 3 is a perspective view separately illustrating only an electrode assembly and an electrode tab in the button-type secondary battery according to Embodiment 1 of the present invention, which is illustrated in FIG. 2.

FIG. 2 is a cross-sectional view of a button-type secondary battery according to Embodiment 1 of the present invention. FIG. 3 is a perspective view separately illustrating only an electrode assembly and an electrode tab in the button-type secondary battery according to Embodiment 1 of the present invention, which is illustrated in FIG. 2.

Referring to FIG. 2, a button-type secondary battery 100 according to Embodiment 1 of the present invention may be a battery having a cylindrical shape, and a diameter of the cylindrical battery may be larger than a height of the battery. Also, the button-type secondary battery 100 according to Embodiment 1 of the present invention may comprise an electrode assembly 150, a lower can 110, and an upper can 130. The electrode assembly 150 may have a shape in which electrodes 151 and separators 152 are alternately stacked to be wound.

Also, the electrode assembly 150 may be inserted into the lower can 110. The lower can 110 may have an opened upper end in a cylindrical shape. The electrode assembly 150 may be in the form of a jelly roll. When the electrode assembly 150 is disposed in the lower can 110, a winding axis of the electrode assembly 150 may be disposed in a shape that is perpendicular to the ground.

In the button-type secondary battery 100 according to Embodiment 1 of the present invention, the lower can 110 may have a first screw thread 111 formed on an outer circumferential surface thereof. In addition, the upper can 130 may have a shape that covers the opening of the upper end of the lower can 110. A second screw thread 132 corresponding to the first screw thread 111 may be formed on an inner circumferential surface of the upper can 130. The first screw thread 111 and the second screw thread 132 may have a relationship in which the upper can 130 and the lower can 110 are screw-coupled to each other when coupled to each other. That is, when the upper can 130 is covered and coupled to the lower can 110, the upper can 130 may be rotated with respect to the lower can 110 so as to be screw-coupled to each other, rather than being pressed as it is so as to be coupled to each other. When the upper can 130 rotates relative to the lower can 110, the first screw thread 111 and the second screw thread 132 may be screw-coupled to each other, and the upper can 130 and the lower can 110 are close to each other. When the screw-coupling is finished, the button-type secondary battery 110, in which the upper can 130 and the lower can 110 are completely coupled to each other, may be manufactured. FIG. 2 illustrates a state in which the upper can 130 and the lower can 110 are completely screw-coupled.

The button-type secondary battery 100 according to Embodiment 1 of the present invention comprises an insulator 170 interposed between the upper can 130 and the lower can 110 to prevent the upper can 130 and the lower can 110 from being short-circuited. The insulator 170 may comprise an inner insulator 171, a connection insulator 172, and an outer insulator 173. The inner insulator 171 may be an insulator portion disposed inside the lower can 110. The outer insulator 173 may be a portion of an insulator disposed outside the lower can 110. In addition, the connection insulator 172 may be an insulator portion connecting the inner insulator 171 to the outer insulator 173.

The insulator 170 may be interposed over an upper end of the lower can 110. That is, the connection insulator 172 may be disposed to cover the upper end of the lower can 110, and the inner insulator 171 may be disposed to be in contact with an inner circumferential portion of the upper end of the lower can. In addition, the outer insulator 173 may be disposed so as to be in contact with the outer circumferential portion of the upper end of the lower can 110. In addition, the outer insulator 173 may be formed to be longer than the inner insulator 171.

Referring to FIG. 2, the upper can 130 and the lower can 110 are screw-coupled to each other by a first screw thread 111 and a second screw thread 132. The outer insulator 173 is interposed between the first screw thread 111 and the second screw thread 132, and the outer insulator 173 is pressed by a protruding shape of each of the first screw thread 111 and the second screw thread 132 to form an unevenness shape and is fitted between the first screw thread 111 and the second screw thread 132.

An end 131 of the upper can may have the same height as an end 173*a* of the outer insulator (see FIG. 2), or an end 173*a* of the outer insulator may has a height lower than an end 131 of the upper can. The fact that the end 173*a* of the outer insulator has a height lower than the end 131 of the upper can means that the end 173*a* of the outer insulator is closer to a bottom surface of the lower can 110 than the end 131 of the upper can.

A process of coupling the upper can 130 to the lower can 110 is as follows. First, the lower can 110 in which the electrode assembly 150 is inserted may be placed, and the insulator 170 may be coupled to the lower can 110 in a manner that covers the upper end of the lower can 110. In a state in which the connection insulator 172 is disposed to cover the upper end of the lower can 110, the inner insulator 171 is in contact with the inner circumferential portion of the upper end of the lower can, and the outer insulator 173 is in contact with the outer circumferential portion of the upper end of the lower can 110, the insulator 170 may be coupled to the lower can 110. Then, it may be coupled by rotating the upper can 130 thereon. That is, the inner circumferential surface of the upper can 130 may be screw-coupled by turning while being in contact with the outer circumferential surface of the outer insulator 173. In this process, since the first screw thread 111 and the second screw thread 132 form a protruding screw thread, the outer insulator 173 is pressed by the protruding shape of each of the first screw thread 111 and the second screw thread 132 to form an uneven shape. In FIG. 2, it is shown that the outer thread has an uneven shape.

Since the upper can 130 and the lower can 110 are coupled to each other by applying a very strong pressure, the upper can 130 may not be easily separated from the lower can 110, and thus strong coupling may be possible. Accordingly, even though the excessive internal pressure is generated by the gas generated inside the battery, the battery may not be separated by the gas pressure, or the gas that is harmful to the human body, may be prevented from leaking out of the battery, and the electrolyte may be prevented from leaking out of the battery.

Here, the insulator 170 may be made of a polybutylene terephthalate (PBT) material. The PBT material may have good mechanical properties, and in particular, high rigidity to realize a battery having excellent airtightness and durability.

The button-type secondary battery 100 according to Embodiment 1 of the present invention may comprise an electrode tab 164 extending from the electrode 151 of the electrode assembly 150. The electrode tab 154 may extend from the electrode 151 of the electrode assembly 150 to be in contact with the upper can 130. The electrode tab 154 may be a positive electrode tab. In this case, the electrode tab 154 may extend from the positive electrode of the electrode assembly 150 to be in contact with the upper can 130.

In the button-type secondary battery 100 according to Embodiment 1 of the present invention, the upper can 130 may comprise an upper can electrode terminal part 133. The upper can electrode terminal part 133 may be a portion connected to the electrode 151 of the electrode assembly 150 through the electrode tab 154 to form a terminal connected to an external device. Particularly, the upper can electrode terminal part 133 may be a portion covering the opening of the upper end of the lower can 110.

In this case, the electrode tab 154 may comprise a contact part 154*a* in contact with the upper can electrode terminal part 133. Specifically, the electrode tab 154 may comprise a support part 154*b* and a contact part 154*a*. The support part 154*b* may be a portion connected to the electrode 151 of the electrode assembly 150. In the case of a positive electrode tab, the support part 154*b* may be connected to the positive electrode. The connection may mean that the support part 154*b* adheres to the positive electrode, or that the support part 154*b* and the positive electrode are integrally formed.

In the button-type secondary battery 100 according to Embodiment 1 of the present invention, the support part 154*b* may be connected to the outermost electrode 151 of the electrode assembly 150. In this case, the support part 154*b* and the lower can 110 may be in contact with each other to cause a risk of the short-circuit accident. To prevent this problem, the inner insulator 171 may be disposed between the electrode tab 154 and the lower can 110 to prevent the electrode tab 154 from being in contact with the lower can 110. In FIG. 3, it is seen that the support part 154*b* and the upper end of the lower can 110 is not in contact with each other because the inner insulator 171 is interposed therebetween.

The contact part 154*a* connected to the support part 154*b* may extend from the support part 154*b* and be in contact with the upper can electrode terminal part 133. Specifically, a top surface of the contact part 154*a* may be in contact with a bottom surface of the upper can 130. In this case, the entire top surface of the contact part 154*a* may be in contact with the bottom surface of the upper can 130. Due to this contact, current may flow between the electrode tab 154 and the upper can 130.

FIG. 3 illustrates only the electrode assembly 150 and the electrode tab 154 in the button-type secondary battery 100 according to Embodiment of the present invention. Referring to FIG. 3, the support part 154*b* may be formed in a bar shape. What is desired here may mean various rod shapes.

That is, it may be in the form of a thin cylindrical rod, and in addition to the shape, it may be in the form of a rectangular pillar rod, or in the form of a triangular pillar rod. Also, the contact part 154*a* may be formed in a circular ring shape. The circular ring shape may mean the overall shape of the contact part 154*a*. That is, a cross-sectional shape of the circular ring may not necessarily be a circle and may have various shapes such as a square or triangle. However, the cross-section may extend along a closed curve to form a circular ring shape as a whole. In addition, a top surface of the circular ring-shaped contact part 154*a* may be a portion that is in contact with the upper can 130. Particularly, the contact part 154*a* may be in contact with the upper can electrode terminal part 133.

The meaning that the contact part 154*a* is in contact with the upper can 130 means that the contact part 154*a* and the upper can 130 do not adhere to each other. It may just mean being in contact with each other. That is, it may mean that, when the upper can 130 is rotated, the upper can 130 and the contact part 154*a* only move relative to each other while being in contact with each other, and the rotation of the upper can 130 does not rotate the contact part 154*a*.

In the related art, the battery is manufactured by bonding the electrode tab 154 to the upper can electrode terminal part 133 through welding. That is, the electrode tab 154 adheres to the upper can 130. However, in this method, when the upper can 130 is rotated to screw-couple the upper can 130 to the lower can 110, the electrode tab 154 is twisted and then broken.

However, in the button-type secondary battery 100 according to Embodiment 1 of the present invention, such a problem does not occur. In the present invention, since the electrode tab 154 is configured to be only in contact with the upper can 130, the electrode tab 154 may not be rotated in place even when the upper can 130 is rotated.

In addition, in the button-type secondary battery 100 according to Embodiment 1 of the present invention, a contact area with the upper can 130 may increase by forming the contact part 154*a* in the circular ring shape. As a result, resistance is reduced to be enabling a smooth current flow.

Also, as a method of further increasing in contact area, there may be a method of increasing in thickness of the contact part 154*a* having the circular ring shape. Here, the thickness may be expressed as a difference between an inner diameter and an outer diameter of the circular ring. As an example of thickening the contact part 154*a*, the thickness of the contact part 154*a* may be thicker than the thickness of the support part 154*b*.

Furthermore, in the present invention, an outer circumferential diameter of the contact part 154*a* formed in the circular ring shape and an outer circumferential diameter of the electrode assembly 150 may have sizes corresponding to each other. In this case, since it means that the diameter of the contact part 154*a* becomes as large as possible, the battery having the lowest resistance may be manufactured with the same thickness.

In addition, a shape of the contact part 154*a* may be implemented in another form in order to reduce an intensity of the resistance. Specifically, the support part 154*b* may be formed in a bar shape, and the contact part 154*a* may be formed in a circular plate shape. If it is formed in the circular plate shape, it may be in surface contact with the upper can to increase in contact area and decrease in resistance.

Although not shown in the drawing, an insulation plate may be provided between the contact part 154*a* and the top surface of the electrode assembly 150. When the electrode tab 154 is a positive electrode tab, the short circuit may occur when the bottom surface of the contact part 154*a* is in contact with the negative electrode of the electrode assembly 150, and the insulation plate may prevent the short circuit from occurring. The insulation plate may be formed in a circular plate shape, and a diameter of the insulation plate may have a size corresponding to the diameter of the electrode assembly 150. Alternatively, the diameter of the insulation plate may have a size corresponding to the diameter of the contact part 154*a*.

Also, in the button-type secondary battery 100 according to Embodiment 1 of the present invention, the method of connecting another electrode tab of the electrode assembly 150 to the lower can 110 may be performed by the welding. Since the electrode tab connected to the lower can 110 is not rotated by the screw coupling, it may not be a problem even if it is connected to the lower can 110 by the welding. That is, unlike when the electrode tab is connected to the upper can 130 by the contact method, it may be connected in a bonding manner.

In the button-type secondary battery 100 according to Embodiment 1 of the present invention, a center hole 153 may be formed in a center of the electrode assembly 150. In addition, a center pin 190 may be provided in the center hole 153 to fully fill the center hole 153. When the center pin 190 is formed to completely fill the center hole 153, the electrode assembly 150 may be prevented from being deformed. A core part of the electrode assembly 150, which has particularly weak supporting force, may be deformed by internal heat and internal gas generated when the battery reaction proceeds. When the core part is deformed as described above, the separator 152 that separates a positive electrode from a negative electrode may be deformed, and thus, a short-circuit accident such as contact of the positive electrode and the negative electrode may occur. However, in the present invention, since the center pin 190 is provided to fully fill the center hole 153, the occurrence of such the short-circuit accident may be prevented in advance.

Embodiment 2

Figure 4:
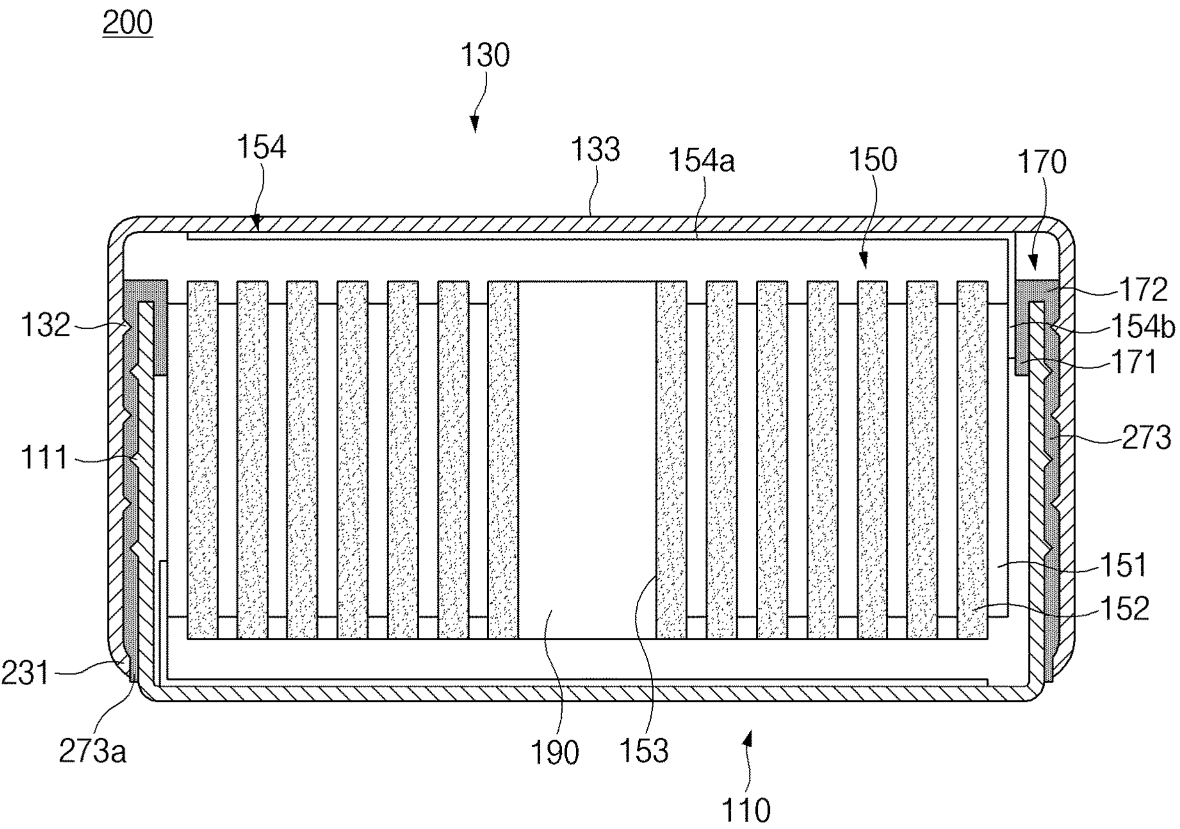
FIG. 4 is a cross-sectional view of a button-type secondary battery according to Embodiment 2 of the present invention.

FIG. 4 is a cross-sectional view of a button-type secondary battery according to Embodiment 2 of the present invention.

Embodiment 2 according to the present invention may be different from Embodiment 1 in that an end 231 of an upper can has a different shape.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 4, in the button-type secondary battery 200 according to Embodiment 2 of the present invention, the end 231 of an upper can may be bent in a direction of a central axis of a lower can 110. When the end 231 of the upper can is bent in this way, coupling force between the upper can 130 and the lower can 110 may be significantly improved. In the method of manufacturing the button-type secondary battery 200 according to Embodiment 2 of the present invention, the upper can 130 that is not bent is first rotated to be screw-coupled to the lower can 110, and after the screw coupling is completed, the end 231 of the upper can may be bent in the direction of the central axis of the lower can 110.

FIG. 4 illustrates that an end 273*a* of an outer insulator further extends downward than the end 231 of the upper can. That is, the outer insulator 273 may extend downward along an outer wall of the lower can 110, but the end 273*a* of the outer insulator may further extend downward than the end 231 of the upper can. Thus, a short-circuit prevention effect of the upper can 130 and the lower can 110 may be enhanced.

Also, the end 273*a* of the outer insulator may extend lengthily to be enough to cover a lower edge of the lower can so as to be in contact with a bottom portion of the lower can. In this manner, when the end 273*a* of the outer insulator extends to be longer, the short-circuit prevention effect of the upper can 130 and the lower can 110 may be further improved.

In addition, a surface that is in contact with the outer insulator 273 at the end 231 of the upper can may be a flat surface. Thus, it is possible to allow the end 231 of the upper can to damage the outer insulator 273. If the end 231 of the upper can is not flat and has a protruding shape, the end 231 of the upper can may be pressed to be bent, and in the process of contacting the outer insulator 273, the contact surface of the outer insulator 273 may be dug or drilled. However, in the present invention, since the tip 231 of the upper can is flat, this problem may be prevented from occurring.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Button-type secondary battery
110: Lower can
111: First screw thread
130: Upper can
131: End of upper can
132: Second screw thread
133: Upper can electrode terminal part
150: Electrode assembly
151: Electrode
152: Separator
153: Center hole
154: Electrode tab
154*a*: Contact part
154*b*: Support part
170: Insulator
171: Inner insulator
172: Connection insulator
173: Outer insulator
173*a*: End of outer insulator
190: Center pin
200: Button-type secondary battery
231: End of upper can
273*a*: End of outer insulator

The invention claimed is:

1. A button-type secondary battery, comprising:
an electrode assembly;
a lower can in which the electrode assembly is disposed and on which a first screw thread is defined on an outer circumferential surface of the lower can;
an upper can which is configured to cover an opening of an upper end of the lower can and on which a second screw thread corresponding to the first screw thread is defined on an inner circumferential surface of the upper can; and
an insulator interposed between the upper can and the lower can to prevent the upper can and the lower can from being electrically short-circuited with each other,
wherein an electrode tab extending from an electrode of the electrode assembly is in contact with the upper can,
wherein the first screw thread faces a flat surface of the upper can,
wherein the second screw thread faces a flat surface of the lower can, and
wherein the first screw thread has an upper surface and a lower surface, and neither the upper surface nor the lower surface is perpendicular to the outer circumferential surface of the lower can.

2. The button-type secondary battery of claim 1, wherein the upper can comprises an upper can electrode terminal part connected to the electrode of the electrode assembly through the electrode tab to form a terminal connected to an external device and configured to cover the opening of the upper end of the lower can, and
wherein the electrode tab comprises:
a support part connected to the electrode of the electrode assembly; and
a contact part extending from the support part so as to be in contact with the upper can electrode terminal part.

3. The button-type secondary battery of claim 2, wherein the support part has a bar shape, and the contact part has a circular ring shape.

4. The button-type secondary battery of claim 3, wherein the contact part having the circular ring shape has a thickness greater than that of the support part.

5. The button-type secondary battery of claim 2, wherein the support part has a bar shape, and the contact part has a circular plate shape.

6. The button-type secondary battery of claim 3, wherein an outer circumferential diameter of the contact part having the circular ring shape and an outer circumferential diameter of the electrode assembly have sizes corresponding to each other.

7. The button-type secondary battery of claim 2, wherein an insulation plate is between the contact part and a top surface of the electrode assembly.

8. The button-type secondary battery of claim 1, wherein the insulator includes a polybutylene terephthalate (PBT) material.

9. The button-type secondary battery of claim 1, wherein the insulator comprises:
an inner insulator disposed inside the lower can;
an outer insulator disposed outside the lower can; and
a connection insulator connecting the inner insulator to the outer insulator.

10. The button-type secondary battery of claim 9, wherein the upper can and the lower can are screw-coupled to each other by the first screw thread and the second screw thread,
wherein the outer insulator is interposed between the first screw thread and the second screw thread, and
wherein the outer insulator is pressed by a protruding shape of each of the first screw thread and the second screw thread to form an uneven shape and is fitted between the first screw thread and the second screw thread.

11. The button-type secondary battery of claim 9, wherein the inner insulator is disposed between the electrode tab and the lower can to prevent the electrode tab and the lower can from being in contact with each other.

12. The button-type secondary battery of claim 1, wherein a center hole is defined at a central portion of the electrode assembly, and wherein a center pin is provided in the center hole to fully fill the center hole.

13. The button-type secondary battery of claim 1, wherein an end of the upper can is bent in a direction of a central axis of the lower can.

14. The button-type secondary battery of claim 9, wherein the outer insulator extends downward along an outer wall of the lower can, and wherein an end of the outer insulator further extends downward than an end of the upper can.

15. The button-type secondary battery of claim 1, wherein a diameter of the button-type secondary battery is greater than a height of the button-type secondary battery.

16. The button-type secondary battery of claim 1, wherein the electrode tab comprises a contact part that is in contact with the upper can to allow current to flow between the electrode tab and the upper can, and wherein the contact part has a circular ring shape.

17. The button-type secondary battery of claim 1, wherein each of the first screw thread and the second screw thread has a pointed tip, and wherein the pointed tip of the first screw thread and the pointed tip of the second screw thread protrude in opposite directions.

* * * * *